United States Patent
Yang et al.

(10) Patent No.: US 6,400,658 B1
(45) Date of Patent: Jun. 4, 2002

(54) DVD-RAM DISK REPRODUCTION APPARATUS FOR REDUCING ERRORS DURING DETECTION OF IDENTIFICATION DATA

(75) Inventors: Chang-Jin Yang, Suwon; Pyong-Yong Seong, Seoul; Seong-Sin Joo, Suwon; Soo-Yul Jung, Kunoo; Jung-Eon Seo, Uiwang; Yong-Jae Lee, Suwon; Jang-Hoon Yoo, Seoul; Tae-Kyung Kim, Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/275,814

(22) Filed: Mar. 25, 1999

Related U.S. Application Data

(60) Provisional application No. 60/079,338, filed on Mar. 25, 1998.

(51) Int. Cl.$^7$ ............................................. G11B 17/221
(52) U.S. Cl. ................. 369/30.25; 369/47.22; 369/47.27; 369/47.47; 369/53.21; 369/59.25; 369/53.35
(58) Field of Search ..................... 369/47.12, 53.21, 369/30.25, 47.22, 59.25, 47.27, 67.47, 53.35; 386/95, 96

(56) References Cited

U.S. PATENT DOCUMENTS 5,694,381 A * 12/1997 Sako ........................ 369/47.12
5,724,474 A * 3/1998 Oguro et al. ................. 386/95

* cited by examiner

Primary Examiner—David Hudspeth
Assistant Examiner—Kim-Kwok Chu
(74) Attorney, Agent, or Firm—Staas & Halsey LLP

(57) ABSTRACT

A DVD-RAM disk reproduction apparatus for reducing an error during detection of ID data, which includes a first operational amplifier for obtaining a sum signal resulting from the addition of four picked-up signals picked up by divided-by-four photodiodes from a DVD-RAM disk having a header region and a recording region, second and third operational amplifiers for respectively obtaining two sum signals corresponding to the upper and lower regions of the header region resulting from the addition of the first and second picked-up signals and the third and fourth picked-up signals, respectively, a fourth operational amplifier for obtaining a difference signal between the two sum signals, a header region detector for detecting upper and lower header region signals corresponding to the upper header region and the lower header region based on the difference signal, and detecting a header region signal corresponding to a header region by logically summing the two detected signals, a first multiplexer for selecting one of the two sum signals obtained by the second and third operational amplifiers according to the upper header region signal, and a second multiplexer for selecting the sum signal selected by the first operational amplifier and the sum signal selected by the first multiplexer according to the header region signal, to thereby output the selected result to an equalizer. Thus, during detection of ID data in a header region, a difference signal between the picked-up four signals is not used, but a signal resulting from the addition of two signals among the picked-up signals according to the corresponding upper and lower regions of the header region is selectively used. Accordingly, ID data can be detected from a signal without deterioration, to thereby reduce an error and thus improve a detection margin.

17 Claims, 8 Drawing Sheets

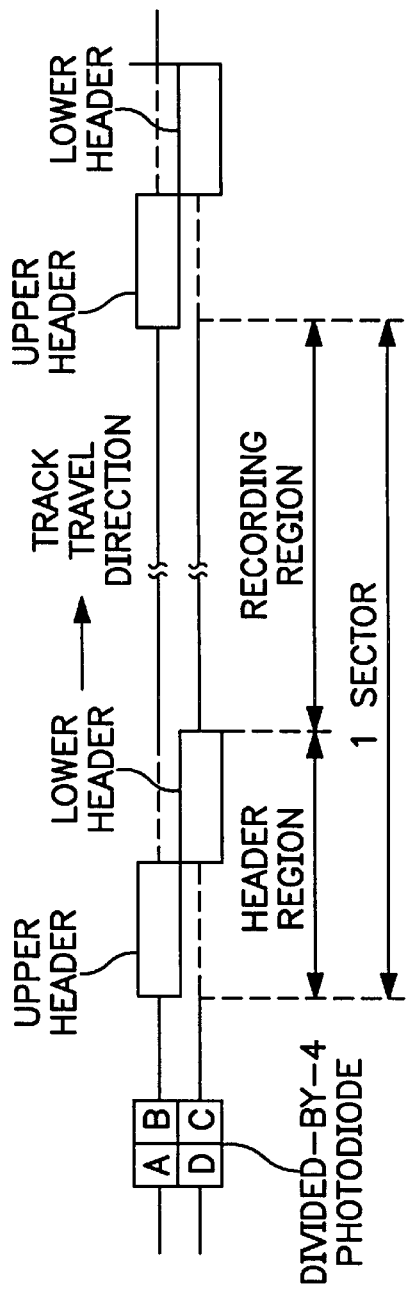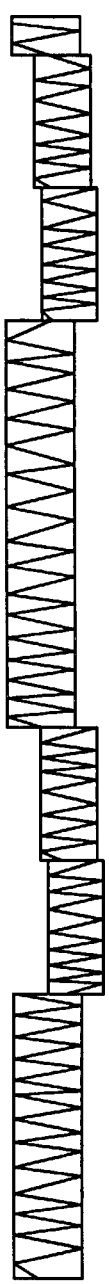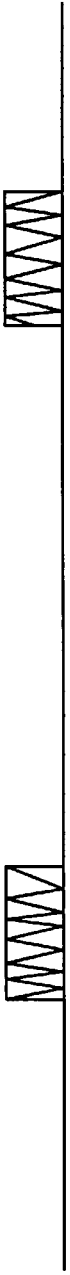
FIG. 5A
FIG. 5B
FIG. 5C

DVD-RAM DISK REPRODUCTION APPARATUS FOR REDUCING ERRORS DURING DETECTION OF IDENTIFICATION DATA

CROSS-REFERENCE TO RELATED APPLICATIONS

This application claims the benefit of Korean Application No. 98-9840, filed Mar. 21, 1998, in the Korean Patent Office and U.S. Provisional Application No. 60/079,338, filed Mar. 25, 1998, the disclosures of which are incorporated herein by reference.

BACKGROUND OF THE INVENTION

The present invention relates to a recordable and reproducible DVD-RAM (digital versatile disk-random access memory) disk reproduction apparatus, and more particularly, to a DVD-RAM disk apparatus for reducing errors during detection of identification (ID) data from a signal read from the DVD-RAM disk.

A recent form of a DVD is a DVD-RAM capable of recording and deleting data freely. Such a DVD-RAM disk has a recording capacity capable of recording massive amounts of data. The DVD-RAM disk comprises data sectors for use in recording data. Each data sector largely includes a header region and a recording region. The header region is divided into two sub-regions which are disposed adjacent to each other. Here, a region which is located in a relatively higher position is defined as an upper header region, and a region which is located in a relatively lower position is defined as a lower header region. The header region includes ID data containing a sector number and sector information. The recording region is called a user region which includes main data being information to be recorded.

FIG. 1 shows the structure of a general DVD-RAM disk reproduction apparatus. Referring to FIG. 1, the DVD-RAM disk reproduction apparatus includes an optical pickup 12 for reading signals from a DVD-RAM disk 11, and a playback signal amplifier 13 for amplifying signals read via the optical pickup 12. The DVD-RAM disk reproduction apparatus also includes an equalizer 14 for receiving a playback signal amplified in the playback signal amplifier 13 and equalizing the received signal for frequency characteristic compensation, a data detector 15 for producing a digital signal from the signal equalized in the equalizer 14, and a phase locked loop (PLL) 16 for synchronizing the output of the data detector 15 with a sync clock and outputting the synchronized result to a digital signal processor.

FIG. 2 is a detailed circuit diagram showing the playback signal amplifier 13 shown in FIG. 1. As shown in FIG. 2, the playback signal amplifier 13 includes a pair of operational amplifiers 21 and 22 for respectively obtaining a sum and a difference of four signals A, B, C and D picked up by divided-by-four photodiodes in the optical pickup 12, and a header region detector 23 for receiving the difference signal obtained by the operational amplifier 22 and detecting a header region of the DVD-RAM disk 11. The header region detector 23 includes an upper header region detector 231 and a lower header region detector 232 for respectively detecting an upper header region and a lower header region based on the input difference signal, and a logical sum unit (OR) 233 for logically summing signals of the detected upper and lower header regions. The playback signal amplifier 13 also includes a multiplexer RF MUX 24 for selecting the sum signal and difference signal obtained in the pair of the operational amplifiers 21 and 22 according to a result of the operation of the logical sum unit 233, and outputting the select result to the equalizer 14. The operation of the conventional DVD-RAM disk reproduction apparatus of FIGS. 1 and 2 having the above structure will be described in more detail with reference to FIGS. 3A through 3G.

As shown in FIG. 3A, the DVD-RAM disk 11 includes a header region and a recording region in each sector of a track, in which the header region comprises two portions of an upper header region and a lower header region. A signal read via the optical pickup 12 from the DVD-RAM disk 11 having such a track structure is processed via two paths in the playback signal amplifier 13.

Referring to FIG. 2, the first operational amplifier 21 of the playback signal amplifier 13 adds all four signals A, B, C and D picked up by the divided-by-four photodiodes in the optical pickup 12 and outputs a sum signal A+B+C+D as shown in FIG. 3B to the multiplexer 24. The second operational amplifier 22 obtains a push-pull signal and outputs a difference signal (A+B)−(C+D) as shown in FIG. 3C to the multiplexer 24, in which the latter added result is subtracted from the former added result. Here, the sum signal A+B+C+D is used in order to reproduce user data recorded in a recording region on a disk track, and the difference signal (A+B)−(C+D) is used in order to reproduce ID data in a header region thereof. Although the signal in the header region also appears in the sum signal A+B+C+D as shown in FIG. 3B, the characteristics of the signal appearing in the difference signal (A+B)−(C+D) as shown in FIG. 3C is better. Thus, the difference signal (A+B)−(C+D) of FIG. 3C is used for detection of the ID data in the header region. The upper header region detector 231 and the lower header region detector 232 in the header region detector 23 commonly receive the difference signal (A+B)−(C+D) shown in FIG. 3C obtained from the second operational amplifier 22 and detect the upper header region and the lower header region, respectively. Accordingly, the upper header region detector 231 and the lower header region detector 232 output the upper header region signal HD1 and the lower header region signal HD2 as shown in FIGS. 3D and 3E, respectively. That is, although not shown in the drawing, the upper header region detector 231 and the lower header region detector 232 include an envelope detector and a comparator, respectively. The upper header region detector 231 and the lower header region detector 232 each detect an envelope value from the difference signal (A+B)−(C+D) and compares the detected envelope value with a corresponding predetermined reference value, to thereby determine a portion corresponding to the upper header region and the lower header region. If the portion is determined as the upper header region or the lower header region, the corresponding upper header region detector 231 or the lower header region detector 232 outputs a high-level signal represented as a binary signal "1" and otherwise outputs a low-level signal represented as a binary signal "O", as the upper header region signal and the lower header region signal as shown in FIGS. 3D and 3E, respectively. The logical sum unit 233 receives the upper and lower header region signals of HD1 and HD2 of FIGS. 3D and 3E detected in the upper header region detector 231 and the lower header region detector 232 and logically sums the received signals, to obtain a header region signal HD3 shown in FIG. 3F and outputs the same as a signal for controlling the multiplexer 24. The multiplexer 24 selectively outputs one of the sum signal A+B+C+D of FIG. 3B and the difference signal (A+B)−(C+D) of FIG. 3C to the equalizer 14 according to the header region signal HD shown in FIG. 3F applied from the logical sum unit 233 in the header region detector 23. That is, the multiplexer 24 selects the difference signal (A+B)–(C+D) of FIG. 3C during a high-level interval represented as a binary signal "1" of FIG. 3F, and selects the sum signal A+B+C+D of FIG. 3B during a low-level interval represented as a binary signal "0", and outputs the selected signal as an RF signal. The equalizer 14 equalizes the RF signal selectively output from the multiplexer 24 in the playback signal amplifier 13 and then compensates for frequency characteristics, to thereby output the compensated result to the data detector 15. The data detector 15 detects data from the equalized signal and the PLL 16 restores the clock to be output to a digital signal processor.

As described above, the conventional DVD-RAM disk reproduction apparatus uses a difference signal (A+B)–(C+D) of the four signals picked up in the photodiodes in the optical pickup, in order to detect ID data of the header region on a DVD-RAM disk track.

Thus, considering the structure of the header region, signals should be picked up only at the divided-by-four photodiodes A and B during pickup of the upper header region, and signals should be picked up only at the divided-by-four photodiodes "C" and "D" during pickup of the lower header region. However, as shown in the waveform of the playback signal reproduced from the DVD-RAM disk in FIG. 6, a signal having a form of a sum signal (C+D) of the photodiodes C and D and not being a direct-current DC component appears in a portion "a" of the photodiodes A+B during pickup of the lower head region. This is caused by inferiority of assembly of an optical system, interference between adjacent tracks, and inferiority of focus/tracking of a servo system. As a result, an amplitude characteristic of a signal portion "b" corresponding to the lower header region in the difference signal (A+B)–(C+D) between the two sum signals deteriorates, to thereby generate an error during detection of ID data.

SUMMARY OF THE INVENTION

To solve the above problems, it is an object of the present invention to provide a DVD-RAM disk reproduction apparatus for properly selecting two sum signals instead of a difference signal to be used for detection of ID data, in order to detect ID data of a header region more stably.

Additional objects and advantages of the invention will be set forth in part in the description which follows and, in part, will be obvious from the description, or may be learned by practice of the invention.

A DVD-RAM disk reproduction apparatus for reducing errors during detection of ID data, the apparatus comprising a DVD-RAM disk having a plurality of data sectors each having a header region, which stores the ID data and includes an upper header region and a lower header region which are disposed adjacent to each other one on the skew top of the other, and a recording region which stores user data; an optical pickup to pick up a plurality of signals from the DVD-RAM disk; a playback signal amplifier which obtains a data signal for reproducing the user data which is recorded in the recording region of the DVD-RAM disk from the plurality of signals picked up from the disk via the optical pickup, obtains an ID signal for reproducing the ID data which is recorded in the header region using a control signal, divides the plurality of signals in correspondence to disposition of the upper header region and the lower header region in the header region to generate the control signal, and outputs the data and ID signals in correspondence to the recording region and the header region; and means for processing the data and ID signals output from the playback signal amplifier.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 5A shows the structure of a track on a DVD-RAM disk, and

FIGS. 5B through 5I are waveform diagrams of respective components shown in FIG. 4.

DETAILED DESCRIPTION OF THE PREFERRED EMBODIMENT

A preferred embodiment of the present invention will be described in detail with reference to the accompanying drawings.

Figure 1:
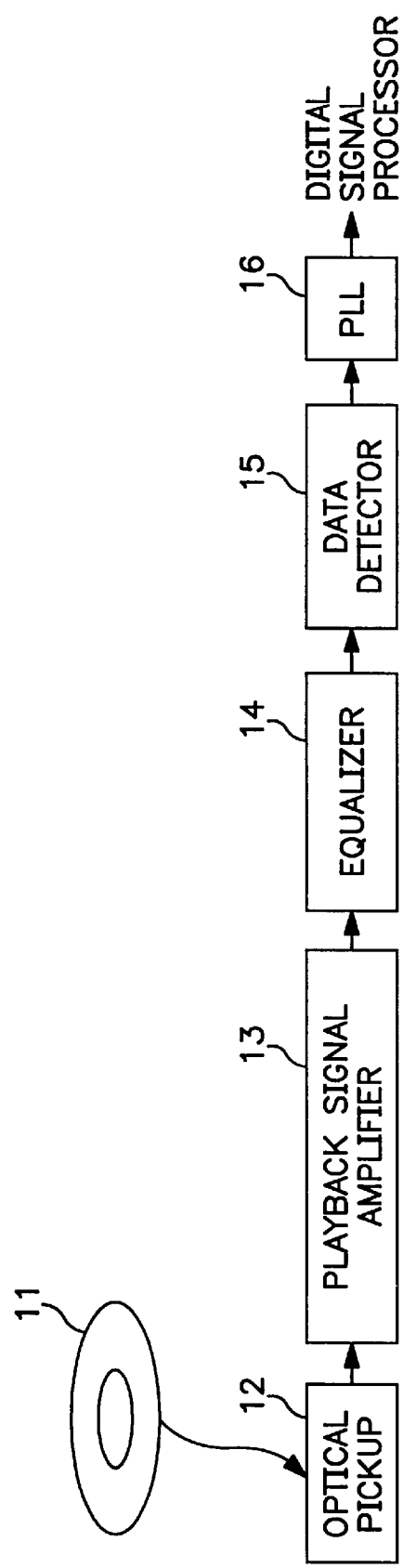
FIG. 1 shows the structure of a general DVD-RAM disk reproduction apparatus.
Figure 4:
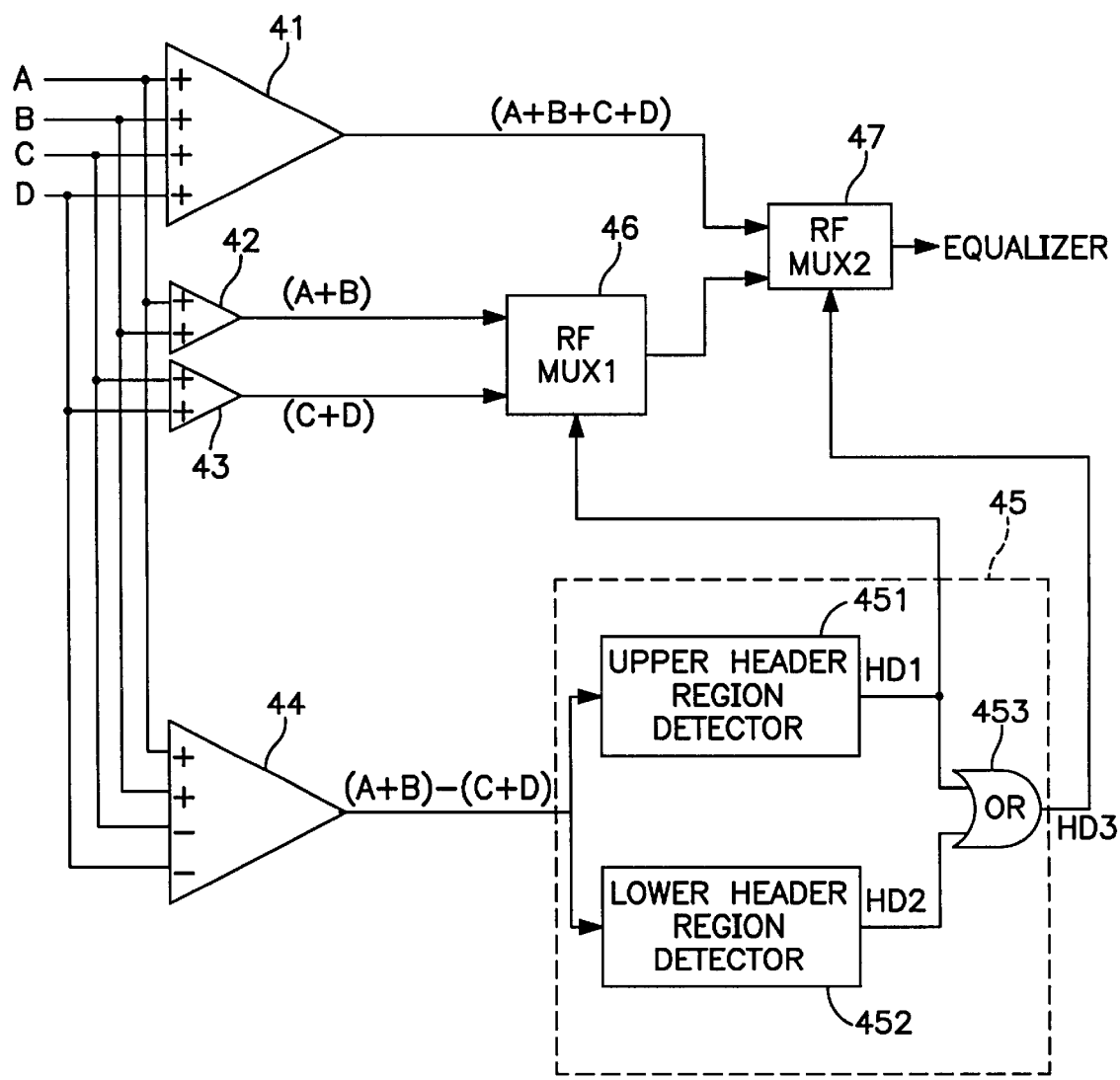
FIG. 4 shows the structure of a playback signal amplifier according to an embodiment of the present invention.

In a DVD-RAM disk reproduction apparatus which is the same as that shown in FIG. 1 with the exception of the playback signal amplifier 13, FIG. 4 shows a structure of a playback signal amplifier according to an embodiment of the present invention, in order to reduce an error during detection of ID data. The playback signal amplifier includes a pair of operational amplifiers 41 and 44 for receiving four signals A, B, C and D picked up via divided-by-four photodiodes in the optical pickup 12 shown in FIG. 1 and obtaining a sum signal and a difference signal, respectively, and a pair of operational amplifiers 42 and 43 for adding two signals (A and B) and (C and D), respectively. The playback signal amplifier (which is used instead of the playback amplifier 13 shown in FIG. 1) also includes a first multiplexer 46 for selectively outputting one of the two sum signals (A+B) and (C+D) obtained by the pair of operational amplifiers 42 and 43 according to a first control signal, and a second multiplexer 47 for selectively outputting one of the sum signal A+B+C+D of the four signals obtained by the operational amplifier 41 and the sum signal (A+B) or (C+D) selected by the first multiplexer 46, according to a second control signal. A header region detector 45 which supplies the first and second control signals to the first and second multiplexers 46 and 47 includes an upper header region detector 451 and a lower header region detector 452 for receiving the difference signal (A+B)–(C+D) obtained by the operational amplifier 44 and detecting an upper header region and a lower header region, respectively. The header region detector 45 also includes a logical sum unit 453 which supplies the upper header region signal HD1 detected in the upper header region detector 451 to the first multiplexer 46 as the first control signal, and logically sums the same with the lower header region signal HD2 detected in the lower header region detector 452, to then supply the operation result HD3 to the second multiplexer 47 as a control signal. The operation of the playback signal amplifier shown in FIG. 4 having the above structure will be described in more detail with reference to FIGS. 5A through 5I.

Figure 3A:
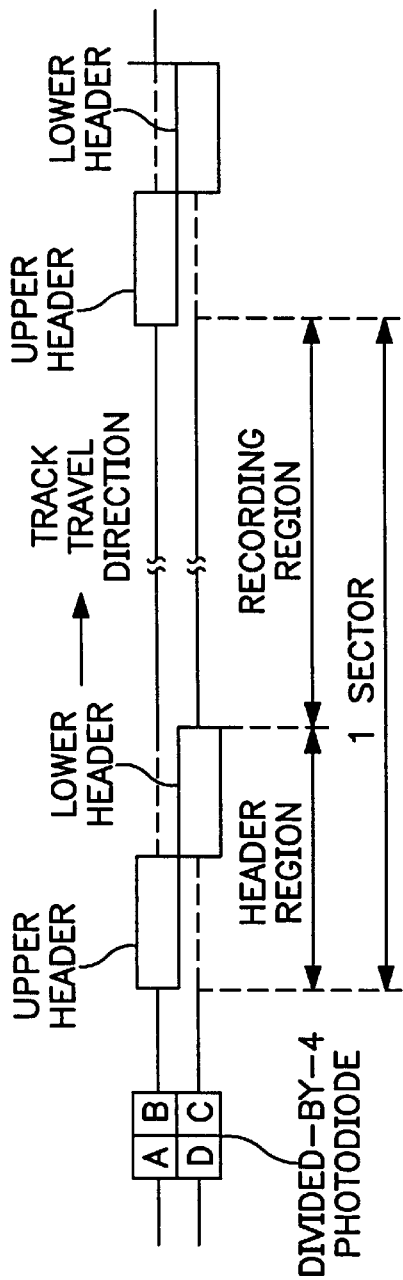
FIG. 3A shows the structure of a track on a DVD-RAM disk.
Figure 3B:
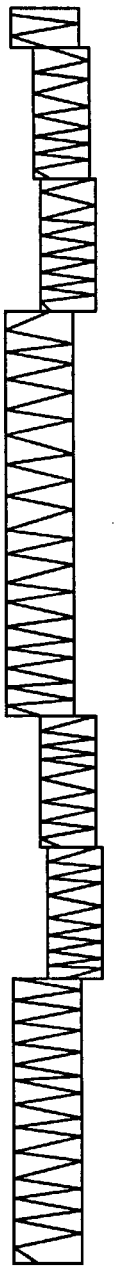
FIGS. 3B through 3G are waveform diagrams of respective components shown in FIG. 2.
Figure 3C:
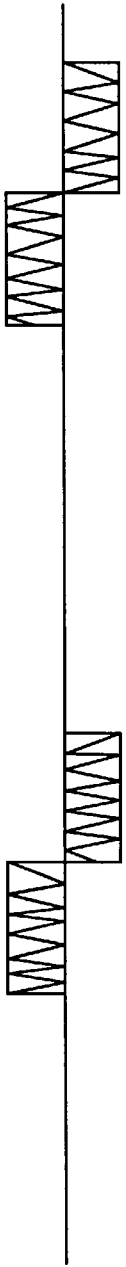
Figure 3D:
Figure 3E:
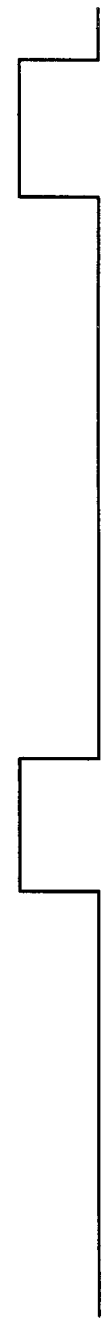
Figure 3F:
Figure 3G:
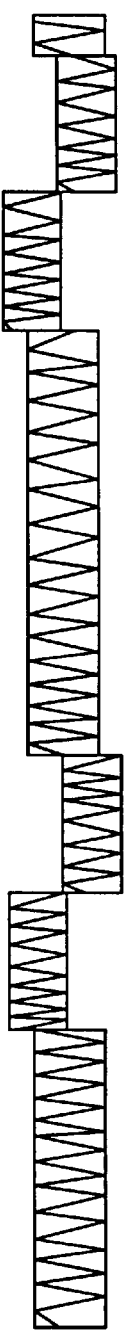
Figure 5D:

A signal read via the optical pickup 12 from the DVD-RAM disk 11 as shown in FIG. 5A is input to the playback signal amplifier of FIG. 4. In the playback signal amplifier, the first operational amplifier 41 adds all four signals A, B, C and D picked up by divided-by-four photodiodes as shown in FIG. 5A, and outputs a sum signal A+B+C+D as shown in FIG. 5B to the second multiplexer 47. The second operational amplifier 42 adds two signals A and B picked up from the upper header region of FIG. 5A among the picked-up four signals A, B, C and D, and outputs the sum signal A+B as shown in FIG. 5C to the first multiplexer 46. The third operational amplifier 43 adds two remaining signals C and D picked up from the lower header region of FIG. 5A among the picked-up four signals A, B, C and D, and outputs the sum signal C+D as shown in FIG. 5D to the first multiplexer 46. The fourth operational amplifier 44 adds every two signals (A+B) and (C+D) among the picked-up four signals A, B, C and D and subtracts a latter one of the two sum signals from the former one of the two sum signals, to then output a difference signal (A+B)−(C+D) to the header region detector 45. The difference signal obtained in the fourth operational amplifier 44 is shown in FIG. 3C.

Figure 2:
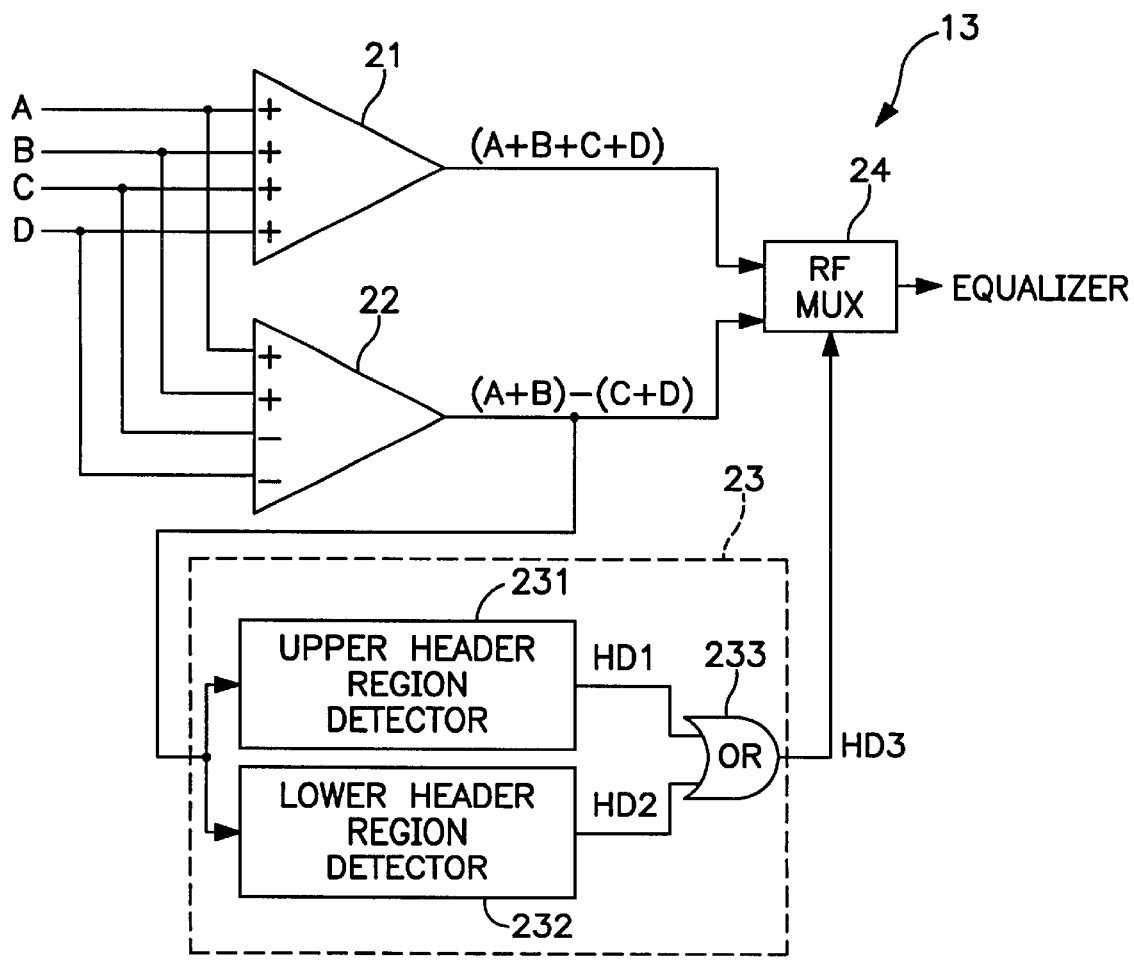
FIG. 2 is a detailed circuit diagram of a playback signal amplifier shown in FIG. 1.

The upper header region detector 451 and the lower header region detector 452 in the header region detector 45 commonly receive the difference signal (A+B)−(C+D) applied from the fourth operational amplifier 44. Here, the upper header region detector 451 and the lower header region detector 452 operate in the same manner as those elements shown in FIG. 2. That is, the upper header region detector 451 outputs the upper header region signal HD1 shown in FIG. 5F having a high-level interval in correspondence to the upper header region among the header regions on the disk track based on the difference signal (A+B)−(C+D), to the logical sum unit 453 and the first multiplexer 46. The lower header region detector 452 outputs the lower header region signal HD2 shown in FIG. 5G having a high-level interval in correspondence to the lower header region among the header regions on the disk track based on the difference signal (A+B)−(C+D), to the logical sum unit 453. The logical sum unit 453 logically sums the upper header region signal HD1 shown in FIG. 5F applied from the upper header region detector 451 and the lower header region signal HD2 shown in FIG. 5G applied from the lower header region detector 452, and outputs the head region signal HD3 as shown in FIG. 5H to the second multiplexer 47.

Figure 5E:
Figure 5F:
Figure 5G:

The first multiplexer 46 selects one of the input two sum signals (A+B) and (C+D) shown in FIGS. 5C and 5D according to the upper header region signal HD1 shown in FIG. 5F, to output the selected result to the second multiplexer 47. That is, the first multiplexer 46 selects the first sum signal A+B shown in FIG. 5C during the high-level interval in which the upper header region signal HD1 shown in FIG. 5F is represented as a binary signal "1", and selects the second sum signal (C+D) shown in FIG. 5D during the low-level interval in which the upper header region signal HD1 shown in FIG. 5F is represented as a binary signal "0." Finally, the output of the first multiplexer 46 becomes a signal as shown in FIG. 5E, which is not a difference signal between the two sum signals (A+B) and (C+D), but a concatenated form of two sum signals. In this embodiment, although the first multiplexer 46 uses the upper header region signal HD1 in order to concatenate the two sum signals (A+B) and (C+D), the lower header region signal HD2 shown in FIG. 5G can be used.

Figure 5H:
Figure 5I:
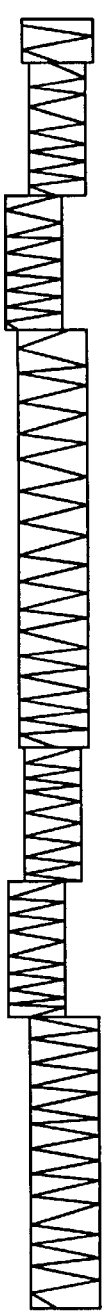
Figure 6:
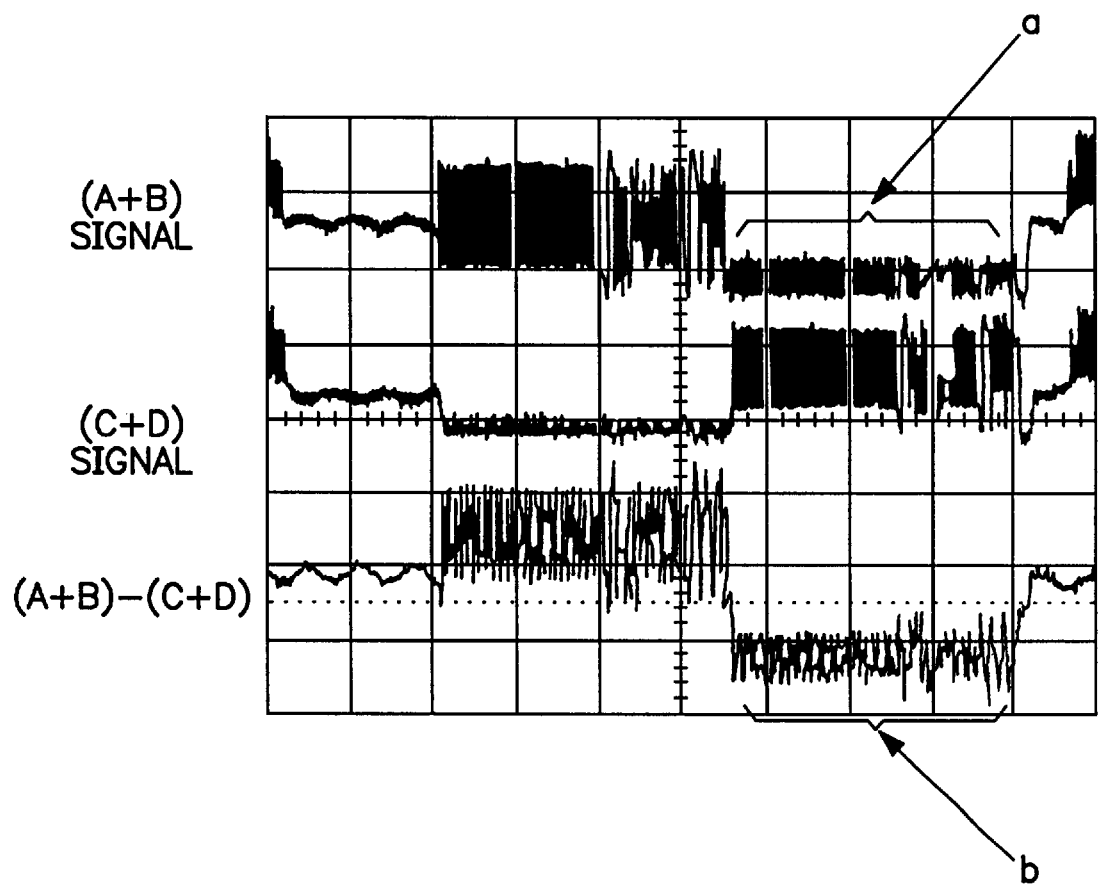
FIG. 6 shows waveform of a signal reproduced from the DVD-RAM disk.

The second multiplexer 47 selects one of the input signals of FIGS. 5B and 5E according to the header region signal HD3 shown in FIG. 5H which is the second control signal and which is the output of the logical sum unit 453, and outputs the selected result to the equalizer 14. That is, the second multiplexer 47 selects the signal shown in FIG. 5E which is the output of the first multiplexer 46 during the high-level interval in which the header region signal HD3 shown in FIG. 5H is represented as a binary signal "1", and selects the sum signal A+B+C+D shown in FIG. 5B during the low-level interval in which the header region signal HD3 shown in FIG. 5H is represented as a binary signal "0." Finally, the output of the second multiplexer 47 becomes a signal as shown in FIG. 5I, in which the sum signal A+B+C+D shown in FIG. 5B corresponding to the recording region interval is selected in correspondence to the recording region of the track. Also, the sum signal A+B shown in FIG. 5C is selected in correspondence to the upper region of the header region, and the sum signal C+D shown in FIG. 5D is selected in correspondence to the lower region of the header region. If the signal has been selected as described above, although a sum signal C+D and not a DC component appears in the portion "a" corresponding to the lower header region of the sum signal A+B as shown in FIG. 6, ID data can be stably detected since the sum signal C+D and the difference signal is not needed.

In this embodiment, the optical pickup having the divided-by-four photodiodes disposed as shown in FIG. 5A has been described. However, those who are skilled in the art can understand many modifications of the optical pickup. Thus, the detailed description of the modified optical pickup will be omitted.

As described above, the DVD-RAM disk reproduction apparatus for reducing the errors during detection of ID data according to the present invention can selectively use two sum signals according to the header region of the track without subtracting one sum signal from the other, and detect the ID data, to thereby reduce an error, when compared with the conventional art where a signal deterioration occurs due to inferiority of assembly of the optical system, and interference during detection of ID data, thereby eliminating errors, using a difference signal of the four signals picked up from the DVD-RAM disk by the divided-by-four photodiodes.

What is claimed is:

1. A DVD-RAM disk reproduction apparatus for reducing errors during detection of ID data, the apparatus comprising:
   a DVD-RAM disk having a plurality of data sectors each having
      a header region, which stores the ID data and includes an upper header region and a lower header region which are disposed adjacent to each other, and
      a recording region which stores user data;
   an optical pickup to pick up a plurality of signals from the DVD-RAM disk;
   a playback signal amplifier which obtains a data signal for reproducing the user data which is recorded in the recording region of the DVD-RAM disk from the plurality of signals picked up from the disk via the optical pickup, obtains an ID signal for reproducing the ID data which is recorded in the header region using a control signal, divides the plurality of signals and separately provides groups of sum signals in correspondence to disposition of the upper header region and the lower header region in the header region to generate the control signal, and outputs the data and ID signals in correspondence to the recording region and the header region; and means for processing the data and ID signals output from the playback signal amplifier.

2. The DVD-RAM disk reproduction apparatus according to claim 1, wherein the optical pickup comprises a plurality of photodiodes which are disposed in up and down directions in correspondence to the upper and lower header regions which are disposed in the up and down directions in the header region.

3. The DVD-RAM disk reproduction apparatus according to claim 2, wherein said playback signal amplifier comprises:
- a plurality of operational amplifiers which determine a first sum signal by adding all of the plurality of picked-up signals to each other, a second sum signal by adding only the pick-up signals picked up from the photodiodes which are disposed relatively in the upper direction, a third sum signal by adding only the picked-up signals picked up from the photodiodes which are disposed relatively in the lower direction, and a difference signal by adding the picked-up signals pickup up from the upper direction photodiodes and subtracting the picked-up signals picked up from the lower direction photodiodes, respectively;
- a header region detector which detects first intervals corresponding to the upper header region and the lower header region based on the difference signal, outputs an upper header region signal and a lower header region signal which represent the detected intervals, respectively, and detects a second interval corresponding to the header region by adding the two detected first intervals, to generate a header region signal;
- a first multiplexer which selectively outputs the second and third sum signals in accordance with one of the upper and lower header region signals to generate a selected sum signal; and
- a second multiplexer which selectively outputs the first sum signal and the selected sum signal in accordance with the header region signal representing the second interval of the header region detected in the header region detector.

4. The DVD-RAM disk reproduction apparatus according to claim 3, wherein said header region detector comprises:
- an upper header region detector which outputs the upper header region signal representing the first interval of the upper header region according to the difference signal;
- a lower header region detector which outputs the lower header region signal representing the first interval of the lower header region according to the difference signal; and
- a logical sum unit which logically sums the upper and lower header region signals which are respectively output from the upper and lower region detectors, and outputs the header region signal representing the second interval of the header region.

5. The DVD-RAM disk reproduction apparatus according to claim 4, wherein:
- the first multiplexer selects the second sum signal during the first interval of the upper header region according to the upper header region signal applied from the upper header region detector, and otherwise selects the third sum signal, to thereby output the select sum signal; and
- the second multiplexer selects the selected sum signal obtained by the first multiplexer during the second interval of the header region according to the header region signal applied from the header region detector, and otherwise selects the first sum signal.

6. The DVD-RAM disk reproduction apparatus according to claim 1, wherein said optical pickup comprises divided-by-four photodiodes.

7. The DVD-RAM disk reproduction apparatus according to claim 6, wherein said playback signal amplifier comprises:
- a plurality of operational amplifiers which determine a first sum signal by adding all of four pick-up signals to each other, a second sum signal by adding only the pick-up signals picked up from the divided-by-four photodiodes which are disposed relatively in the upper direction, a third sum signal by adding only the pick-up signals picked up from the divided-by-four photodiodes which are disposed relatively in the lower direction, and a difference signal by adding the pick-up signals picked up from the upper direction divided-by-four photodiodes and subtracting the pick-up signals picked up from the lower direction divided-by-four photodiodes, respectively;
- a header region detector which detects first intervals corresponding to the upper header region and the lower header region based on the difference signal, outputs an upper header region signal and a lower header region signal which represent the detected intervals, respectively, and detects a second interval corresponding to the header region by adding the two detected first intervals, to generate a header region signal;
- a first multiplexer which selectively outputs the second and third sum signals in accordance with one of the upper and lower header region signals to generate a selected sum signal; and
- a second multiplexer which selectively outputs the first sum signal and the selected sum signal in accordance with the header region signal representing the second interval of the header region detected in the header region detector.

8. The DVD-RAM disk reproduction apparatus according to claim 7, wherein said header region detector comprises:
- an upper header region detector which outputs the upper header region signal representing the first interval of the upper header region according to the difference signal;
- a lower header region detector which outputs the lower header region signal representing the first interval of the lower header region according to the difference signal; and
- a logical sum unit which logically sums the upper and lower header region signals which are respectively output from the upper and lower region detectors, and outputs the header region signal representing the second interval of the header region.

9. The DVD-RAM disk reproduction apparatus according to claim 8, wherein the first multiplexer selects the third sum signal during the first interval of the lower header region according to the lower header region signal if the lower header region signal is input from the lower header region detector, and otherwise selects the second sum signal, to thereby output the selected sum signal.

10. A DVD-RAM disk reproduction apparatus for reducing errors during detection of ID data from a DVD-RAM disk having a plurality of data sectors each having a header region, which stores the ID data and includes an upper header region and a lower header region which are disposed adjacent to each other one on the skew top of the other, and a recording region which stores user data, DVD-RAM disk reproduction apparatus comprising:

an optical pickup to pick up a plurality of signals from the DVD-RAM disk;

a playback signal amplifier which obtains a data signal for reproducing the user data which is recorded in the recording region of the DVD-RAM disk from the plurality of signals picked up from the disk via the optical pickup, obtains an ID signal for reproducing the ID data which is recorded in the header region using a control signal, divides the plurality of signals and separately provides groups of sum signals in correspondence to disposition of the upper header region and the lower header region in the header region to generate the control signal, and outputs the data and ID signals in correspondence to the recording region and the header region; and means for processing the data and ID signals output from the playback signal amplifier.

11. The DVD-RAM disk reproduction apparatus according to claim 10, wherein the optical pickup comprises a plurality of photodiodes which are disposed in up and down directions in correspondence to the upper and lower header regions which are disposed in the up and down directions in the header region.

12. The DVD-RAM disk reproduction apparatus according to claim 11, wherein said playback signal amplifier comprises:

a plurality of operational amplifiers which determine a first sum signal by adding all of the plurality of picked-up signals to each other, a second sum signal by adding only the pick-up signals picked up from the photodiodes which are disposed relatively in the up per direction, a third sum signal by adding only the picked-up signals picked up from the photodiodes which are disposed relatively in the lower direction, and a difference signal by adding the picked-up signals pickup up from the upper direction photodiodes and subtracting the picked-up signals picked up from the lower direction photodiodes, respectively;

a header region detector which detects first intervals corresponding to the upper header region and the lower header region based on the difference signal, outputs an upper header region signal and a lower header region signal which represent the detected intervals, respectively, and detects a second interval corresponding to the header region by adding the two detected first intervals, to generate a header region signal;

a first multiplexer which selectively outputs the second and third sum signals in accordance with one of the upper and lower header region signals to generate a selected sum signal; and a second multiplexer which selectively outputs the first sum signal and the selected sum signal in accordance with the header region signal representing the second interval of the header region detected in the header region detector.

13. The DVD-RAM disk reproduction apparatus according to claim 12, wherein said header region detector comprises:

an upper header region detector which outputs the upper header region signal representing the first interval of the upper header region according to the difference signal;

a lower header region detector which outputs the lower header region signal representing the first interval of the lower header region according to the difference signal; and a logical sum unit which logically sums the upper and lower header region signals which are respectively output from the upper and lower region detectors, and outputs the header region signal representing the second interval of the header region.

14. A DVD-RAM disk reproduction apparatus for reducing errors during detection of ID data from a DVD-RAM disk having a plurality of data sectors each having a header region, which stores the ID data and includes an upper header region and a lower header region which are disposed adjacent to each other, and a recording region which stores user data, the DVD-RAM disk reproduction apparatus comprising:

an optical pickup to pick up a plurality of signals from the DVD-RAM disk;

a playback signal amplifier which obtains a data signal for reproducing the user data which is recorded in the recording region of the DVD-RAM disk from the plurality of signals picked up from the disk via the optical pickup, determines a first sum signal corresponding to first ones of the picked-up signals corresponding to the upper header region, determines a second sum signal corresponding to second ones of the picked-up signals corresponding to the lower region, and separately provides said first and second sum signals, and determines an ID signal for reproducing the ID data which is recorded in the header region based upon the separately provided first and second sum signals; and a processor which processes the data and ID signals output from the playback signal amplifier.

15. The DVD-RAM disk reproduction apparatus as claimed in claim 14, wherein:

the optical pickup comprises
a first plurality of photodiodes corresponding to the upper header region, to generate the first ones of the picked-up signals,
a second plurality of photodiodes corresponding to the upper header region, to generate the second ones of the picked-up signals; and the playback signal amplifier comprises
a first adder to add the first and second ones of the picked-up signals to each other, to generate the data signal,
a second adder to add the first ones of the picked-up signals to each other, to generate the first sum signal,
a third adder to add the second ones of the picked-up signals to each other, to generate the second sum signal,
a device to subtract the second ones of the picked-up signals from the first ones of the picked up signals, to generate a difference signal,
a header region detector to determine upper and lower header region signals corresponding to the upper and lower header regions based upon the difference signal, and determine a header region signal corresponding to the header region by adding the upper and lower header region signals,
a first selector to selectively output the first and second sum signals based upon one of the upper and lower header region signals, to generate a selected sum signal, and
a second selector to selectively output the data signal and the selected sum signal based upon the header region signal.

16. The DVD-RAM disk reproduction apparatus according to claim 15, wherein said header region detector comprises:

an upper header region detector which outputs the upper header region signal representing an interval of the upper header region according to the difference signal;

a lower header region detector which outputs the lower header region signal representing an interval of the lower header region according to the difference signal; and a logical sum unit which logically sums the upper and lower header region signals which are respectively output from the upper and lower region detectors, and outputs the header region signal representing the interval of the header region.

17. A DVD-RAM disk reproduction apparatus for reducing errors during detection of ID data from a DVD-RAM disk having a plurality of data sectors each having a header region which stores the ID data and a recording region which stores user data, the DVD-RAM disk reproduction apparatus comprising:

an optical pickup to pick up a plurality of signals from the DVD-RAM disk;

a playback signal amplifier which obtains a data signal for reproducing the user data which is recorded in the recording region of the DVD-RAM disk from the plurality of signals picked up from the disk via the optical pickup, and determines an ID signal for reproducing the ID data which is recorded in the header region based upon separately provided first and second sets of sum signals of the plurality of signals; and a processor which processes the data and ID signals output from the playback signal amplifier.

* * * * *

UNITED STATES PATENT AND TRADEMARK OFFICE
CERTIFICATE OF CORRECTION

PATENT NO.    : 6,400,658 B1
DATED         : June 4, 2002
INVENTOR(S)   : Chang-Jin Yang et al.

It is certified that error appears in the above-identified patent and that said Letters Patent is hereby corrected as shown below:

<u>Title page,</u>
Insert -- [30] Foreign Application Priority Data
       March 21, 1998  (KR) ……….. 98-9840. --

<u>Column 9,</u>
Line 31, change "up per" to -- upper --.

Signed and Sealed this

Fifth Day of November, 2002

Attest:

Attesting Officer

JAMES E. ROGAN
Director of the United States Patent and Trademark Office